US007921276B2

(12) United States Patent
Illikkal et al.

(10) Patent No.: US 7,921,276 B2
(45) Date of Patent: Apr. 5, 2011

(54) APPLYING QUALITY OF SERVICE (QOS) TO A TRANSLATION LOOKASIDE BUFFER (TLB)

(75) Inventors: Ramesh Illikkal, Portland, OR (US); Hari Kannan, Stanford, CA (US); Ravishankar Iyer, Portland, OR (US); Donald Newell, Portland, OR (US); Jaideep Moses, Portland, OR (US); Li Zhao, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 502 days.

(21) Appl. No.: 11/726,316

(22) Filed: Mar. 21, 2007

(65) Prior Publication Data

US 2008/0235487 A1 Sep. 25, 2008

(51) Int. Cl.
*G06F 12/10* (2006.01)

(52) U.S. Cl. ...................................... 711/207

(58) Field of Classification Search .................. 711/207, 711/133, 134
See application file for complete search history.

(56) References Cited

U.S. PATENT DOCUMENTS

| 6,223,256 | B1 * | 4/2001 | Gaither ........................ 711/134 |
| 6,829,679 | B2 * | 12/2004 | DeSota et al. ................. 711/133 |
| 7,415,575 | B1 | 8/2008 | Tong et al. |
| 2003/0177313 | A1 | 9/2003 | Iyer et al. |
| 2005/0114605 | A1 | 5/2005 | Iyer |
| 2007/0006230 | A1 * | 1/2007 | Neiger et al. ................. 718/100 |
| 2008/0235457 | A1 | 9/2008 | Hasenplaugh et al. |

OTHER PUBLICATIONS

U.S. Appl. No. 11/503,633, filed Aug. 14, 2006, entitled "Providing Quality of Service (QoS) for Cache Architectures Using Priority Information," by Li Zhao, et al.

U.S. Appl. No. 11/527,222, filed Sep. 25, 2006, entitled "Quality of Service Implementations for Platform Resources," by Ramesh G. Illikkal, et al.

Volkmar Uhlig, et al., "Performance of Address-Space Multiplexing on the Pentium," 2002, pp. 1-15.

Aravind Menon, et al., "Diagnosing Performance Overheads in the Xen Virtual Machine Environment," Jun. 2005, pp. 1-11.

Gil Neiger, et al., "Intel® Virtualization Technology: Hardware Support for Efficient Processor Virtualization," Aug. 10, 2006, pp. 167-179.

U.S. Patent and Trademark Office, Office Action mailed Aug. 25, 2009, with Reply to Office Action filed on Nov. 24, 2009, in U.S. Appl. No. 11/726,238.

U.S. Patent and Trademark Office, First Office Action dated Jul. 2, 2008 with Reply to Office Action mailed Oct. 1, 2008, in U.S. Appl. No. 11/503,633.

U.S. Patent and Trademark Office, Final Office Action dated Jan. 15, 2009 with Reply to Final Office Action mailed Mar. 10, 2009, in U.S. Appl. No. 11/503,633.

U.S. Patent and Trademark Office, Advisory Action dated Mar. 20, 2009 with Notice of Appeal mailed May 13, 2009 in U.S. Appl. No. 11/503,633.

U.S. Patent and Trademark Office, Notice of Allowance dated Jan. 13, 2010 in U.S. Appl. No. 11/726,238.

* cited by examiner

*Primary Examiner* — Duc T Doan
(74) *Attorney, Agent, or Firm* — Trop, Pruner & Hu, P.C.

(57) ABSTRACT

In one embodiment, the present invention includes a translation lookaside buffer (TLB) having storage locations each including a priority indicator field to store a priority level associated with an agent that requested storage of the data in the TLB, and an identifier field to store an identifier of the agent, where the TLB is apportioned according to a plurality of priority levels. Other embodiments are described and claimed.

15 Claims, 4 Drawing Sheets

APPLYING QUALITY OF SERVICE (QOS) TO A TRANSLATION LOOKASIDE BUFFER (TLB)

BACKGROUND

In recent years, virtualization has re-emerged as a means to improve utilization of available compute power and to enhance overall system reliability. However, virtualization overhead has become a major obstacle for mainstream adoption. One of the major overheads of virtualization is related to increased misses in certain memory structures such as a translation lookaside buffer (TLB). While performance improvement can be achieved by tagging the TLBs and avoiding a TLB flush during a virtual machine (VM) context switch, this makes the TLB structures a shared resource between multiple VMs. As with any shared resource, its performance within a VM context will then be impacted heavily by other VMs' use of the TLB. For example, a streaming application which touches several pages of memory may potentially use up all the TLB entries, wiping out the entries associated with the other VMs. This can adversely affect the performance of these other VMs when they get scheduled later, leading to both degraded and non-deterministic performance of VMs in a consolidated environment.

DETAILED DESCRIPTION

In various embodiments, a mechanism to manage TLB resources to provide more deterministic individual performance and overall performance improvement may be provided. Specifically, Quality of Service (QoS) capabilities may be added to TLB resources (TLB QoS) by providing TLB resource management capability in processor hardware, exposing TLB management capabilities to software through instruction set architecture (ISA) extensions, and enabling software to make use of the TLB QoS capabilities provided by the processor.

Figure 1:
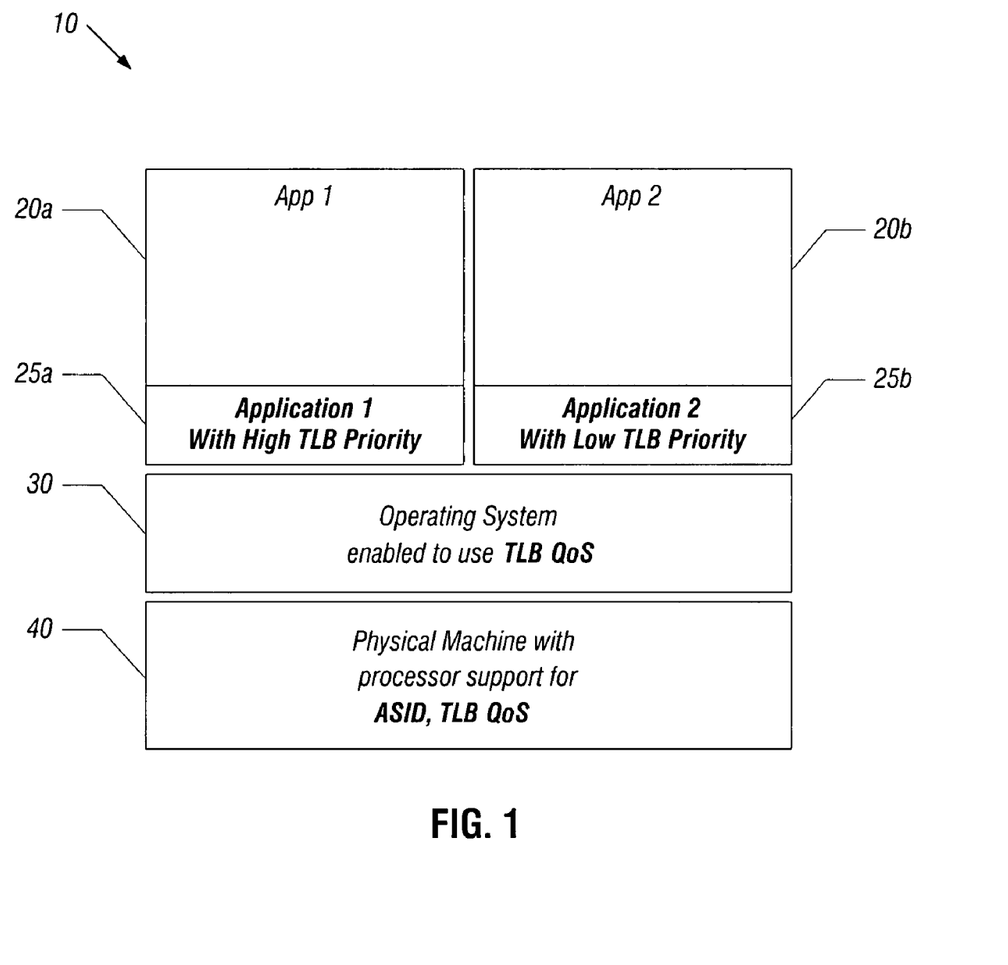
FIG. 1 is a block diagram of a system in accordance with an embodiment of the present invention.

In different implementations, TLB QoS models may be used within an operating system (OS) using application specific identifiers (ASID) and a virtual machine monitor (VMM) using virtual processor identifiers (VPIDs). In the context of an application level QoS, FIG. 1 shows a block diagram of a system 10. As shown in FIG. 1, system 10 may include two applications $20_a$-$20_b$ (generically application 20) in which first application $20_a$ is tagged with a high TLB priority level $25_a$, while second application $20_b$ is tagged with a low TLB priority level $25_b$. System 10 further includes an OS 30 that is enabled to use TLB QoS mechanisms. OS 30 may operate on a physical machine 40 that includes processor support for QoS measures, including TLB QoS mechanisms, which may be enabled using ASIDs or VPIDs. Even though the TLB QoS mechanism is equally applicable in both scenarios (OS and VMM), the following discussion is focused on the VMM scenario. TLB QoS may also support two (or more) levels required by OS and VMM layers if enabled together.

Processor hardware ensures priority enforcement inside the core through a task priority register (TPR) which is essentially a mechanism to manage the available compute resources. Such QoS capability may be provided to the rest of the platform through better cache, memory and input/output (IO) management such as through a platform QoS register (PQR). The TLB QoS may be exposed to software as part of a PQR, in some embodiments.

Embodiments may be used to provide a more balanced performance profile such as for consolidation-based use models. Once implemented in the processor hardware, the TLB QoS features may be used either for priority enforcement between VMs or to provide preferential treatment to the VMM over its VMs. In both these cases, the management of TLB resources can be done statically against a pre-specified set of priorities or it can be managed dynamically to achieve a specified performance goal.

In one embodiment, individual VMs are assigned a specified priority level compared to other VMs, and the TLB may be apportioned based on the priority levels. A specific hardware implementation may specify several priority levels based on software requirements and hardware complexity. For example, there may be four priority levels supported, and the individual priorities may be specified to be 100%, 40%, 20% and 0%. These priority levels may be provided by system administrators through a system configuration manager or derived dynamically from pre-specified performance goals for VMs. Once specified, these priorities are associated with the VPIDs associated with the corresponding VMs (or ASIDs associated with applications). Shown in Table 1 below is an example priority assignment for a data center consolidation use model.

TABLE 1

| VPID | Application running in VM | Associated priority |
| --- | --- | --- |
| 1 | Front-end Web server | 10% |
| 2 | Application Server | 40% |
| 3 | Database Server | 100% |
| Other | Other VMs | 30% |

In the above example, a front-end web server gets minimum priority with 10%. This means the VM running the web server (VPID=1) gets minimum priority among all the VMs running. One reason for setting such a low priority is to avoid the impact of non-TLB friendly applications like a web server on the other VMs. Restricting the access to 10% of all the available TLBs avoids unnecessary pollution by the transient data TLBs associated with network IO. A restricted least recently used (LRU) replacement mechanism at set level or global level may be used for these low priority TLB replacements. In other embodiments the enforcement may be applied using way-partitioning mechanisms similar to the mechanisms employed in set associative caches.

As shown in Table 1, a database server is given maximum priority and is favored by access to more TLB entries. In this example, it is given 100%, which is the highest priority level. This means that it has access to all the TLB resources in the processor. A simple LRU replacement across all the TLBs may be used in this case. The VM running an application sever gets medium priority with 40% in the above example. All other VMs may be clubbed into another level with 40% priority. These applications and priority values are given as examples and the number of levels. supported and the values associated with different levels are implementation specific.

Even though the above example regards prioritization across multiple VMs, it is noted that the same mechanism can be used to provide prioritization of the VMM over other VMs. Since the VMM is assigned a special VPID (for example, zero in one embodiment), the implementation and enforcement mechanisms remain the same. High priority assigned to a VMM allows the VMM TLB entries to be kept around longer. This improves the VMM performance and potentially overall performance. A typical example priority assignment is given in Table 2 below:

TABLE 2

| VPID | Application | Associated priority |
|---|---|---|
| 0 | VMM/Hypervisor | 100% |
| 1 | IO VM (TLB unfriendly) | 10% |
| Above 2 | Other VMs | 80% |

In this example, the VMM is given highest priority with 100% access to all the TLB resources. By restricting the VM TLB accesses to 80%, the VMM is guaranteed to keep a minimum of 20% of the TLB resources for its own use without any pollution from VMs. This makes the VMM perform better, which may result in overall performance improvement. Individual VMs (like the IO VM) may be restricted with more limited access further if needed as shown in Table 2.

The TLB QoS interface to software may provide for priorities to be set through a PQR or through page table entries. Access to these priority structures may be restricted through traditional privilege level checking and can be centrally managed by the VMM/hypervisor. In some embodiments, the priorities may be set by system administrators based on overall performance requirements.

Figure 2:
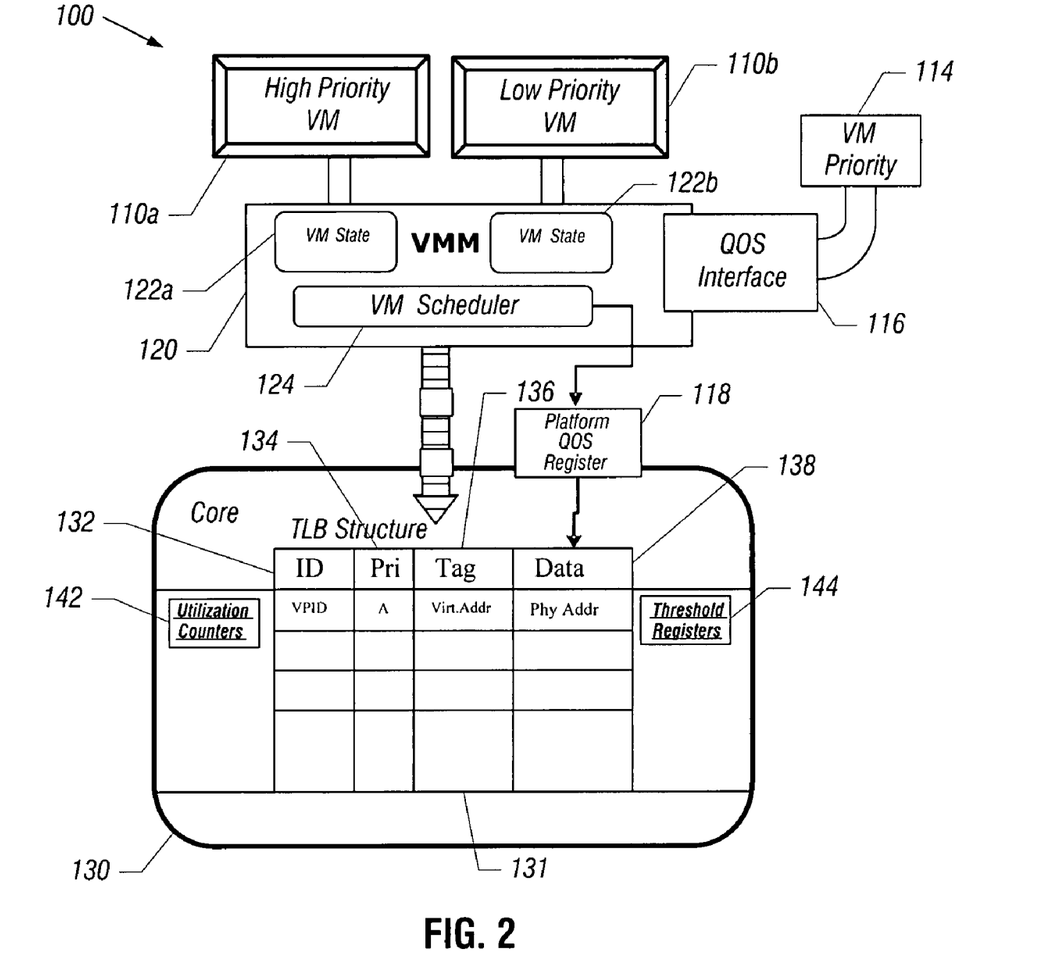
FIG. 2 is a block diagram of a portion of a system in accordance with an embodiment of the present invention.

Referring now to FIG. 2, shown is a block diagram of a system in accordance with an embodiment of the present invention. As shown in FIG. 2, system 100 is shown in the context of a VM implementation, although in other embodiments an OS-based system that provides QoS support on an application level may also be used. As shown in FIG. 2, the VMM (or OS) is enhanced for TLB QoS and provides a QoS interface to set individual VM's TLB priority. A VMM scheduler manages these TLB priorities in the VM state and communicates them to processor hardware through a platform QoS register (e.g., a PQR) as part of VM scheduling. In this way, the processor is aware of a current VM's TLB priority and may allocate TLB resources accordingly. In the embodiment of FIG. 2, TLB resources may include structures, logic, firmware, software or combinations thereof to provide the following capabilities: priority class bits; utilization counters per priority class; threshold registers for each priority class; and a QoS-aware TLB replacement algorithm.

As shown in FIG. 2, a plurality of virtual machines $110_a$ and $110_b$ (generically VM 110) may include a high priority VM $110_a$ and a low priority VM $110_b$. These virtual machines may be managed by a VMM 120. VMM 120 may include state storage for each of the virtual machines, namely VM state $122_a$ and VM state $122_b$. Furthermore, VMM 120 may include a VM scheduler 124 to schedule requests of the VMs on various hardware resources. To enforce QoS mechanisms with respect to the VMs, a VM priority 114 may be received from a user, basic input/output system (BIOS), or an OS, for example, to provide an indication of the priority level associated with each VM which may be provided to a QoS interface 116 that provides exposure to VMM 120. As further shown in FIG. 2, VM scheduler 124 may also communicate with a platform QoS mechanism 118 which, in one embodiment, may be a PQR to provide enforcement of a desired QoS and which is coupled to various system hardware including, for example, a processor core 130.

As an example of such a hardware resource, shown in FIG. 2 is processor core 130 that includes a TLB 131. TLB 131 may include various structures such as an identifier portion 132, a priority portion 134, a tag portion 136, and a data portion 138. Each entry in TLB 131 may store information associated with each of these fields or portions. Specifically, identifier portion 132 may identify, e.g., via a VPID, identification of a VM with which the entry is associated. Priority portion 134 may store a priority class associated with this VM, while tag portion 136 may store a virtual address and data portion 138 may store a physical address. As further shown in FIG. 2, TLB 131 may further include utilization counters 142 and threshold registers 144. Utilization counters 142 may include, e.g., a counter for each priority class of virtual machine. For example, in one embodiment, four such classes, classes A-D may be present. A given counter of utilization counters 142 may be updated (i.e., incremented on insertion, decremented on eviction) when an entry associated with that priority class is inserted or replaced in TLB 131. Accordingly, utilization counters 142 count usage of TLB 131 per priority.

To enforce QoS mechanisms, threshold registers 144 may also be used. Such threshold registers may be used to store a threshold level for each priority class. For example, continuing with the example of four classes A-D, four registers may be present in threshold registers 144, each to store a threshold amount for a given priority class. Such threshold registers 144 may be accessed during operation of a replacement algorithm to enforce QoS measures. While shown with this particular implementation in the embodiment of FIG. 2, the scope of the present invention is not limited in this regard.

To monitor and enforce utilization for different priority classes, the TLB entries may be tagged with a priority level of the corresponding VM. Utilization counters 142 may be used to monitor TLB space utilization per priority level. QoS enforcement is done by managing threshold registers 144 per priority level and ensuring that the utilization does not exceed the threshold set for that individual priority class. As an example, for a 128 entry TLB, class A is given access to all 128 TLB entries (100%), class B is restricted to 64 entries (50%), class C to 32 entries (25%), and class D to 13 entries (10%). Threshold registers 144 may be set to default values at boot time by BIOS, which may be modified later by a system administrator. The QoS enforcement may be performed via a TLB replacement algorithm which is QoS aware. The victim for replacement is decided based on the current utilization of each priority class. Once the quota is reached for any priority class, the replacement is done within the same priority. This restricts the utilization of each priority class to its predefined threshold. This per priority utilization information can also be used by the OS/VMM to make software level scheduling decisions and for metering and chargeback in utility data center scenarios in which multiple clients can operate in VMs of a single system such as a data center server.

Figure 3:
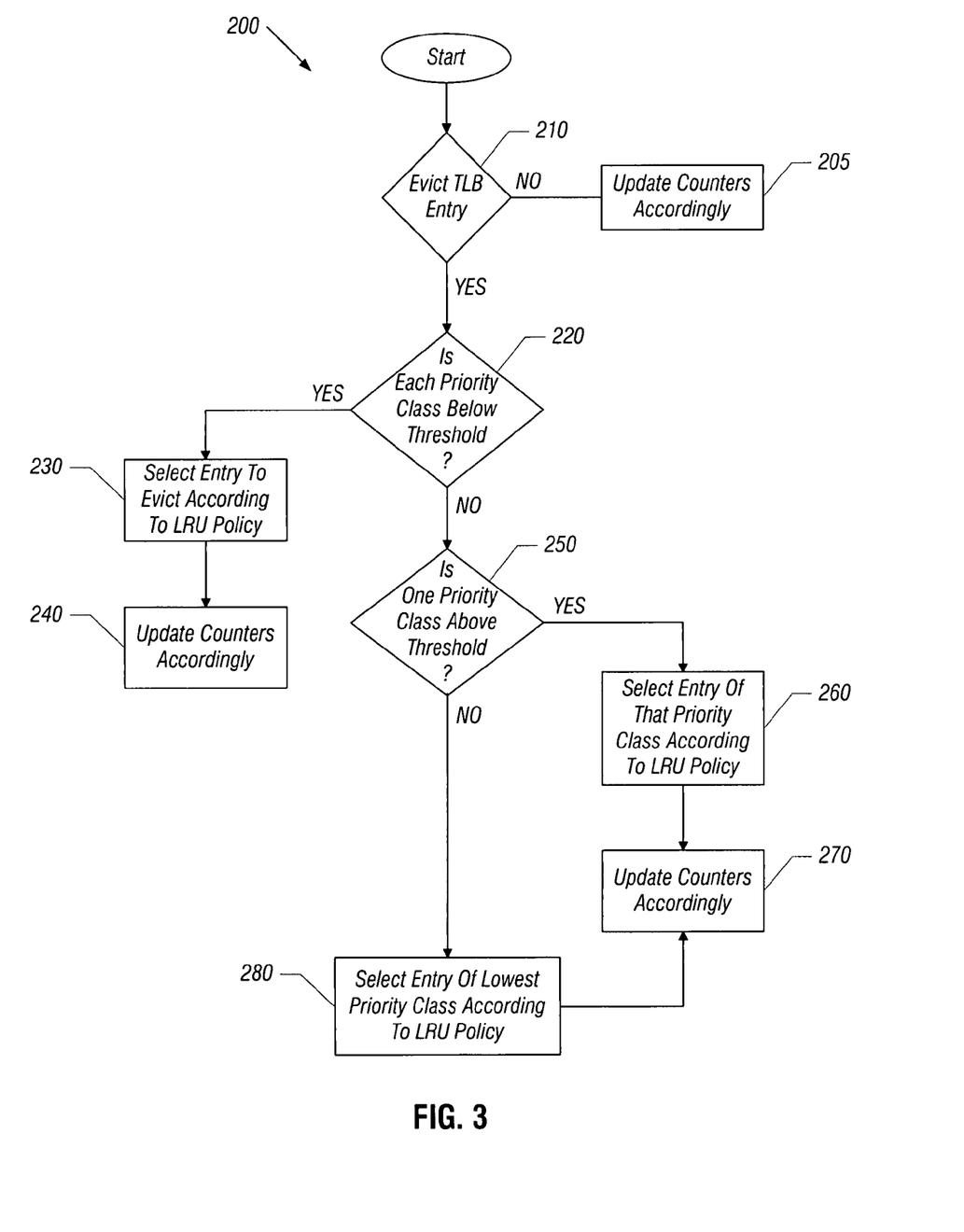
FIG. 3 is a flow diagram of a method in accordance with an embodiment of the present invention.

As described above, in various embodiments priority information associated with TLB entries may be used in connection with determining an appropriate entry for replacement. Referring now to FIG. 3, shown is a flow diagram of a method in accordance with an embodiment of the present invention. As shown in FIG. 3, method 200 may begin by determining whether a TLB entry is to be evicted (diamond 210). For example, such a determination may occur when data is to be allocated into a TLB and no empty space is present in the TLB. If space is available and no entry is to be evicted, diamond 210 may pass control to block 205, where a counter associated with the priority class of the application or VM requests the insertion of data to be updated. If it is instead determined that a TLB entry is to be evicted, control passes to diamond 220. There, it may be determined whether each of multiple priority classes is below a predetermined threshold for the level (diamond 220). For ease of discussion, assume that three such priority classes exist. The determination in diamond 220 thus inquires as to whether the number of actual TLB entries in the TLB for each of the priority classes is below a predetermined threshold for the given level. Note that the determination made in diamond 220 may be at different granularity levels in different embodiments. For example, in some embodiments only an overall TLB-level analysis may be performed, while in other embodiments a set-based analysis (or other segmentation strategy) may be performed.

In any event, if it is determined that each priority level is below its threshold, control passes to block 230. There, a TLB entry may be selected for eviction according to a desired replacement policy (block 230). For example, in many implementations a least recently used (LRU) policy may be implemented such that the oldest TLB entry may be selected for replacement. Upon replacement, the counters that were analyzed in diamond 220 may be updated accordingly (block 240). For example, if the evicted TLB entry was of priority level 0 and the newly allocated TLB entry was of priority level 1, the corresponding priority level 0 counter may be decremented and the priority level 1 counter may be incremented.

Referring still to FIG. 3, if instead at diamond 220 it is determined that each priority level is not below its threshold, control passes to diamond 250. At diamond 250, it may be determined if only a single priority level is above its threshold (diamond 250). If so, control passes to block 260. At block 260, a TLB entry of the priority level that is exceeding its threshold may be selected for replacement, e.g., according to an LRU policy (block 260). Then the counters may be updated accordingly (block 270).

If instead at diamond 250 it is determined that multiple priority levels are above their thresholds, control passes to block 280. At block 280, a TLB of the lowest priority level (that exceeds its threshold) may be selected for replacement, e.g., according to an LRU policy (block 280). Then, control passes to block 270, discussed above. While described with this particular implementation in the embodiment of FIG. 3, it is to be understood that the scope of the present invention is not limited in this manner. For example, in some embodiments a combination of different granularities of counters may be analyzed in connection with replacement activities. In other embodiments, priority bit masks may be used to enforce way partitioning.

Figure 4:
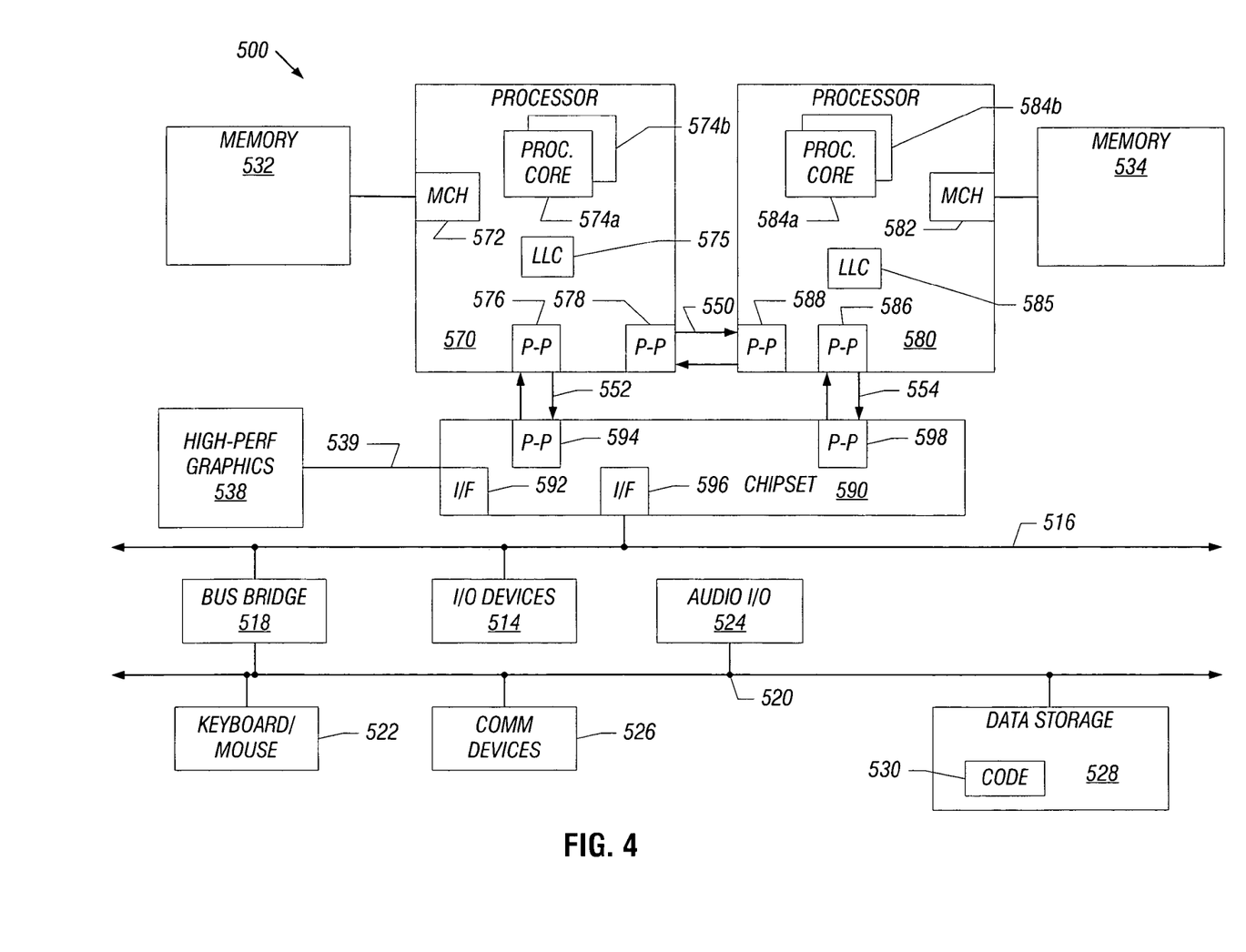
FIG. 4 is a block diagram of a multiprocessor system in accordance with an embodiment of the present invention.

Embodiments may be suited for large-scale CMP platforms, where the TLB space allocation is controlled by hardware to realize fairness and reduce pollution; however, embodiments may be implemented in many different system types including single processor desktop systems. Referring now to FIG. 4, shown is a block diagram of a multiprocessor system in accordance with an embodiment of the present invention. As shown in FIG. 4, multiprocessor system 500 is a point-to-point interconnect system, and includes a first processor 570 and a second processor 580 coupled via a point-to-point interconnect 550. However, in other embodiments the multiprocessor system may be of another bus architecture, such as a multi-drop bus or another such implementation. As shown in FIG. 4, each of processors 570 and 580 may be multi-core processors including first and second processor cores (i.e., processor cores 574a and 574b and processor cores 584a and 584b), although other cores and potentially many more other cores may be present in particular embodiments. While not shown in the embodiment of FIG. 4, is to be understood that the first and second processor cores may each include one or more cache memories including one or more TLBs. A TLB controller or other control logic within processors 570 and 580 may enable the TLBs to perform replacement activities using a counter-based analysis, as described above. Furthermore, as shown in FIG. 4 a last-level cache memory 575 and 585 may be coupled to each pair of processor cores 574a and 574b and 584a and 584b, respectively, and may include second level TLBs, in some embodiments.

Still referring to FIG. 4, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 4, MCH's 572 and 582 couple the processors to respective memories, namely a memory 532 and a memory 534, which may be portions of main memory (e.g., a dynamic random access memory (DRAM)) locally attached to the respective processors.

First processor 570 and second processor 580 may be coupled to a chipset 590 via P-P interconnects 552 and 554, respectively. As shown in FIG. 4, chipset 590 includes P-P interfaces 594 and 598. Furthermore, chipset 590 includes an interface 592 to couple chipset 590 with a high performance graphics engine 538. In one embodiment, an Advanced Graphics Port (AGP) bus 539 may be used to couple graphics engine 538 to chipset 590. AGP bus 539 may conform to the Accelerated Graphics Port Interface Specification, Revision 2.0, published May 4, 1998, by Intel Corporation, Santa Clara, Calif. Alternately, a point-to-point interconnect 539 may couple these components.

In turn, chipset 590 may be coupled to a first bus 516 via an interface 596. In one embodiment, first bus 516 may be a Peripheral Component Interconnect (PCI) bus, as defined by the PCI Local Bus Specification, Production Version, Revision 2.1, dated June 1995 or a bus such as the PCI Express bus or another third generation input/output (I/O) interconnect bus, although the scope of the present invention is not so limited.

As shown in FIG. 4, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard/mouse 522, communication devices 526 and a data storage unit 528 which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Thus embodiments may provide quality of service at the TLB resource level. By adding application and VM level tagging to TLB's, TLBs may be long lived and shared while being managed for predictable and improved performance.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    associating a first priority indicator with data stored in an entry of a translation lookaside buffer (TLB) by a first virtual machine (VM) corresponding to a first virtual machine monitor (VMM) having a first priority level to indicate the first priority level of the first VM, associating a first identifier of the first VM with the data in the entry, and storing the first priority indicator and the first identifier in the entry;
    updating a count value of a counter associated with the first priority level and indicative of a number of entries in the TLB having the first priority level, wherein the TLB includes the counter and other counters each associated with a different priority level;
    determining whether to replace a data element having the first priority level based at least in part on the count value; and
    selecting the data element having the first priority level for replacement if the count value is over a threshold for the first priority level, the threshold stored in a threshold storage of the TLB including a plurality of thresholds, each for one of the priority levels, wherein a sum of the thresholds can exceed a physical size of TLB.

2. The method of claim 1, further comprising selecting a data element associated with a second priority indicator for replacement, wherein a count value of a second counter indicative of a number of entries in the TLB having a second priority level associated with the second priority indicator exceeds a corresponding threshold for the second priority level stored in the threshold storage, and the count value associated with the first priority indicator is below a corresponding threshold.

3. The method of claim 1, further comprising receiving the first priority indicator and the first identifier in the TLB from the first VMM.

4. The method of claim 3, further comprising enabling a user to assign the first priority level to the first VM, wherein the first priority level is lower than a priority level associated with the first VMM.

5. The method of claim 1, further comprising associating a second priority indicator with data stored by a second VM corresponding to the first VMM having a second priority level in an entry of the TLB, wherein the first priority level is higher than the second priority level, the first VM corresponding to a non-input/output application and the second VM corresponding to an input/output application.

6. The method of claim 1, wherein a maximum value for one of the thresholds corresponds the physical size of the TLB.

7. An apparatus comprising:
    a translation lookaside buffer (TLB) having a plurality of storage locations, each of the storage locations having a priority indicator field to store a priority level associated with an agent that requested storage of data in the TLB, and an identifier field to store an identifier of the agent, wherein the TLB is apportioned according to a plurality of priority levels, the TLB further including a counter array including a plurality of priority level counters each associated with a different priority level to store a count of the number of storage locations in the TLB having data of the associated priority level, and a threshold storage to store threshold values for each of the priority levels respectively, wherein a sum of the threshold values can exceed a physical size of the TLB.

8. The apparatus of claim 7, wherein the TLB is to select a storage location for replacement based at least in part on the value of the priority level counter associated with the priority level of the storage location to be replaced.

9. The apparatus of claim 8, wherein the TLB is to determine if one of the plurality of priority level counters associated with a first priority level exceeds a threshold value for the first priority level and to select a data element of the first priority level for eviction if the priority level counter associated with the first priority level exceeds the threshold value.

10. The apparatus of claim 7, wherein a first agent is to be assigned a first priority level and a second agent is to be assigned a second priority level, wherein the first agent is to cause greater evictions from the TLB than the second agent, and wherein the threshold value for the first priority level is lower than the threshold value for the second priority level.

11. The apparatus of claim 10, wherein an operating system (OS) is to provide the first priority level to the first agent, the first agent having a first application space identifier, and the second priority level to the second agent, the second agent having a second application space identifier.

12. The apparatus of claim 7, further comprising a virtual machine monitor (VMM) coupled to the TLB to provide the priority level associated with the agent that requested storage of the data and the identifier of the agent, wherein the TLB is to receive the priority level from a platform quality of service register (PQR).

13. The apparatus of claim 12, wherein the VMM is to provide an interface between a plurality of VMs and the TLB, wherein at least a first VM is of a first priority level and a second VM is of a second priority level, wherein the first VM is to perform an input/output (IO) application and the second VM is to perform a non-IO application, wherein the IO application causes more TLB evictions than the non-IO application.

14. The apparatus of claim 13, wherein the apparatus further comprises a multiprocessor system including a processor core having the TLB and the PQR.

15. A system comprising:
    a processor including at least one core, the core including a translation lookaside buffer (TLB) having a plurality of storage locations, each of the storage locations having a priority indicator field to store a priority level associated with an agent that requested storage of data in the TLB and an identifier field to store an identifier of the agent, wherein the TLB is apportioned according to a plurality of priority levels, the TLB further including a counter array including a plurality of priority level counters each associated with a different priority level to store a count of the number of storage locations in the TLB having data of the associated priority level, and a threshold storage to store threshold values for each of the priority levels, wherein the TLB is to evict an entry of a first priority level if only the first priority level counter exceeds the first threshold value, and otherwise the TLB is to evict an entry of a lowest priority level if more than one priority level counter exceeds the corresponding threshold level; and
    a virtual machine monitor (VMM) coupled to the processor to provide the priority level and the identifier for the agent that requested storage of the data, wherein the TLB is to receive the priority level from a platform quality of service register (PQR), and wherein the VMM is to provide an interface between a plurality of virtual machines (VMs) and the processor, wherein at least a first VM is of a first priority level and a second VM is of a second priority level, each priority level corresponding to a percentage of TLB resources to which the corresponding agent is allowed access, and a sum of percentage of TLB resources for a plurality of the agents can exceed a physical size of the TLB.

* * * * *

UNITED STATES PATENT AND TRADEMARK OFFICE
CERTIFICATE OF CORRECTION

| | | |
|---|---|---|
| PATENT NO. | : 7,921,276 B2 | Page 1 of 1 |
| APPLICATION NO. | : 11/726316 | |
| DATED | : April 5, 2011 | |
| INVENTOR(S) | : Ramesh Illikkal et al. | |

It is certified that error appears in the above-identified patent and that said Letters Patent is hereby corrected as shown below:

Column 7:
Line 55, "corresponds the" should be --corresponds to the--.

Signed and Sealed this
Fourteenth Day of June, 2011

David J. Kappos
*Director of the United States Patent and Trademark Office*